US012638693B2

(12) United States Patent
Butler

(10) Patent No.: US 12,638,693 B2
(45) Date of Patent: May 26, 2026

(54) EYEWEAR WITH INWARDLY BIASED TEMPLES

(71) Applicant: Jon Scott Butler, Lakeland, FL (US)

(72) Inventor: Jon Scott Butler, Lakeland, FL (US)

( * ) Notice: Subject to any disclaimer, the term of this patent is extended or adjusted under 35 U.S.C. 154(b) by 0 days.

(21) Appl. No.: 18/641,721

(22) Filed: Apr. 22, 2024

(65) Prior Publication Data

US 2024/0345416 A1 Oct. 17, 2024

Related U.S. Application Data

(63) Continuation-in-part of application No. 18/108,118, filed on Feb. 10, 2023, now abandoned.

(51) Int. Cl.
*G02C 5/22* (2006.01)

(52) U.S. Cl.
CPC ....... *G02C 5/2227* (2013.01); *G02C 2200/28* (2013.01)

(58) Field of Classification Search
CPC .... G02C 5/2227; G02C 2200/28; G02C 5/14; G02C 5/143; G02C 5/22; G02C 5/2218
See application file for complete search history.

(56) References Cited

U.S. PATENT DOCUMENTS

| | | | | |
|---|---|---|---|---|
| 1,942,298 A | * | 1/1934 | Le Doux | G02C 5/146 |
| | | | | 351/111 |
| 2,094,236 A | * | 9/1937 | Hempel | G02C 5/143 |
| | | | | 351/111 |
| 2,814,968 A | * | 12/1957 | Nixon, Jr. | G02C 5/143 |
| | | | | 351/63 |
| 3,385,646 A | * | 5/1968 | Johnson | G02C 5/2227 |
| | | | | 16/307 |
| 3,671,111 A | * | 6/1972 | Okner | G02C 5/2227 |
| | | | | 351/113 |
| 7,165,838 B1 | * | 1/2007 | Sapp | G02C 5/001 |
| | | | | 351/63 |
| 9,134,544 B2 | * | 9/2015 | Rochford | G02C 5/2272 |
| 10,175,501 B1 | * | 1/2019 | Singer | G02C 5/20 |
| 2013/0063695 A1 | * | 3/2013 | Hsieh | G02C 5/2209 |
| | | | | 351/113 |
| 2021/0080747 A1 | * | 3/2021 | Ragonese | G02C 5/2263 |

FOREIGN PATENT DOCUMENTS

| | | | | |
|---|---|---|---|---|
| EP | 0973057 A1 | * | 1/2000 | G02C 5/2227 |
| EP | 1808725 A1 | * | 7/2007 | G02C 3/003 |

OTHER PUBLICATIONS

Machine translation of EP1808725 retrieved electronically from Espacenet Jul. 29, 2024 (Year: 2024).*
Machine translation of EP 0973057 A1 retrieved electronically from PE2E Search Dec. 20, 2025 (Year: 2000).*

* cited by examiner

*Primary Examiner* — Cara E Rakowski
(74) *Attorney, Agent, or Firm* — GrayRobinson, P.A.

(57) ABSTRACT

Disclosed is a pair of glasses with inwardly biased temples that can frictionally secure the glasses over the temples of a wearer. This allows the temples to be shorter in length and eliminates the need for the temples to be secured to the ears. The biasing of the temples is achieved, in one embodiment, via torsion springs integrated into the hinges of the glasses.

2 Claims, 4 Drawing Sheets

EYEWEAR WITH INWARDLY BIASED TEMPLES

CROSS REFERENCE TO RELATED APPLICATIONS

This is a continuation-in-part of and claims priority to co-pending U.S. patent application Ser. No. 18/108,118 filed on Feb. 10, 2023, and entitled "Eyewear with Inwardly Biased Temples," the contents of this application are fully incorporated herein for all purposes.

TECHNICAL FIELD

This disclosure relates to glasses that are worn on a user's temples. More particularly, the present disclosure relates to glasses with inwardly biased temple pieces that do not engage the user's ears.

BACKGROUND OF THE INVENTION

Current eyewear employs a design that traces its origin to the 13th century. This design includes a frame that houses one or more lens, a nose bridge, and pivotal temple pieces that engage the user's ears. This well-known design can be used for prescription lenses, magnifiers, bifocals, trifocals, or sunglasses. This design features frames that rest upon the bridge of the user's nose as well as the user's ears.

Various efforts have been employed over the years to improve upon this design. One such effort is disclosed in U.S. Patent Application Publication No. 2021/0080747 to Ragonese. Ragonese discloses a pivotable eyeglass frame with a shortened temple bar with suction cups for holding the temple portion to a user's face. The suction cups also allow the glasses to pivot from a normal position to a raised position. Additionally, U.S. Pat. No. 9,134,544 to Rochford et. al. discloses eyeglasses with a front frame portion and first and second side portions extending from opposite sides of the front frame. The side portions of Rochford are configured to end at a user's temples. The temples can be mounted via a flexible living hinge. Finally, U.S. Pat. No. 7,165,838 to Sapp discloses tensioning eyewear. The eyewear includes truncated temple members that are secured via a temple hinge assembly. Separate expandable elastic and padded band members tension about the user's face and are attached to the temple members.

Although each of the foregoing designs accomplishes its own unique objective, they all suffer from common drawbacks. Namely, none of the background art illustrates a pair of glasses with inwardly biased temples, wherein the biasing force alone is sufficient to secure the glasses to the head of the wearer. The background art also lacks a teaching of a biasing spring that is secured within the hinges of the glasses. The eyewear of the present disclosure is aimed at overcoming these and other shortcomings found in the background art.

SUMMARY OF THE INVENTION

It is an object of the present disclosure to provide a pair of glasses that can be secured to a user's head without the glasses engaging or touching the user's ears.

It is another an object of the present disclosure to provide eyewear with inwardly biased temple members with the biasing force being sufficient to retain the glasses in position.

It is still yet another object of the present disclosure to provide eyewear with biased temple members, wherein the biasing is provided by torsion springs mounted within the hinges of the glasses.

Another object of the present disclosure is to provide glasses that employ a compact design and that a user can take on or off with minimal effort.

These and other objects of the invention can be achieved via a pair of eyeglasses that include a frame with opposing ends, a pair of lens openings, and a nose bridge. A mounting aperture and a recess are positioned within each end of the frame. The eyeglasses also include a pair of temple pieces, with each temple piece including a protrusion that is fitted into one of the recesses of the frame. A pair of pins, are utilized to mount the temple pieces to the frame. Specifically, each pin is positioned within one of the mounting apertures of the frame to hingedly connect one of the temple pieces to the frame. A pair of torsion springs provide the biasing force. Each torsion spring includes a first end mounted within one of the temple pieces and a second end mounted within the frame. Thus, the torsion springs bias the temple pieces inwardly to secure the frame over the temples of a wearer.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

Similar reference numerals refer to similar parts throughout the several views of the drawings.

| Parts List | |
| --- | --- |
| 20 | Glasses |
| 22 | Frame |
| 24 | Ends of Frame |
| 26 | Lens Openings |
| 28 | Nose Bridge |
| 32 | Hinge Assemblies |
| 34 | Mounting Apertures |
| 36 | Recesses |
| 38 | Temple Pieces |
| 42 | First End of Temple Piece |
| 44 | Second End of Temple Piece |
| 46 | Protrusions from Temple Pieces |
| 48 | Pins |
| 52 | Upper Head of Pin |
| 54 | Lower Body of Pin |
| 56 | Torsion Springs |
| 58 | Central Portion of Torsion Spring |
| 62 | First End of Torsion Spring |
| 64 | Second End of Torsion Spring |

DETAILED DESCRIPTION OF THE DRAWINGS

The present disclosure relates to a pair of glasses with inwardly biased temples that can frictionally and positively secure the glasses over the temples of a wearer. This allows the temples to be shorter in length and eliminates the need for the temples to be secured over the ears. The biasing of the temples is achieved, in one embodiment, via torsion springs integrated into the hinges of the glasses. The various features of the present disclosure, and the manner in which they interrelate, are described in greater detail hereinafter.

Figure 1:
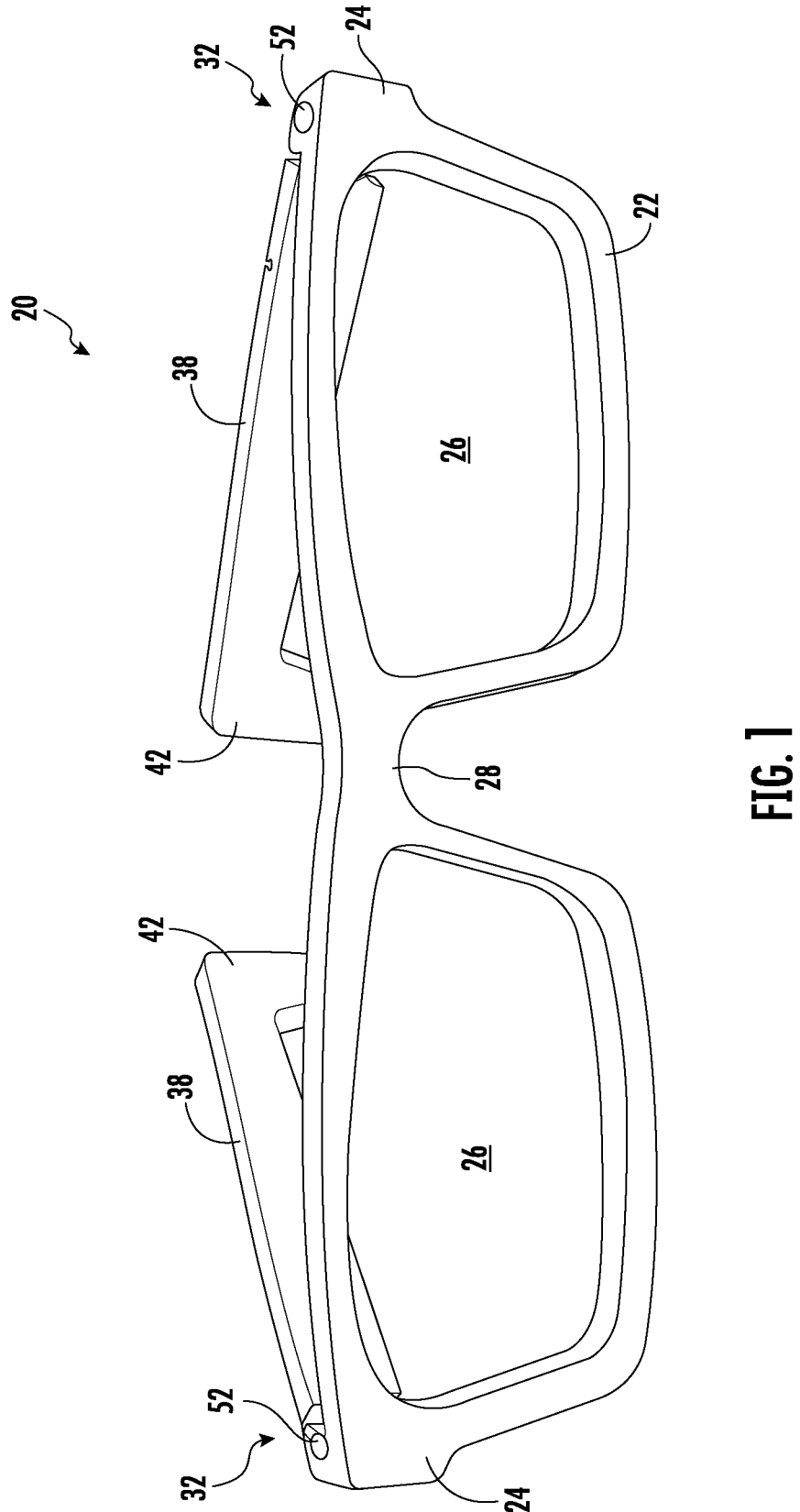
FIG. 1 is a front elevational view of the eyeglasses of the present disclosure.
Figure 2:
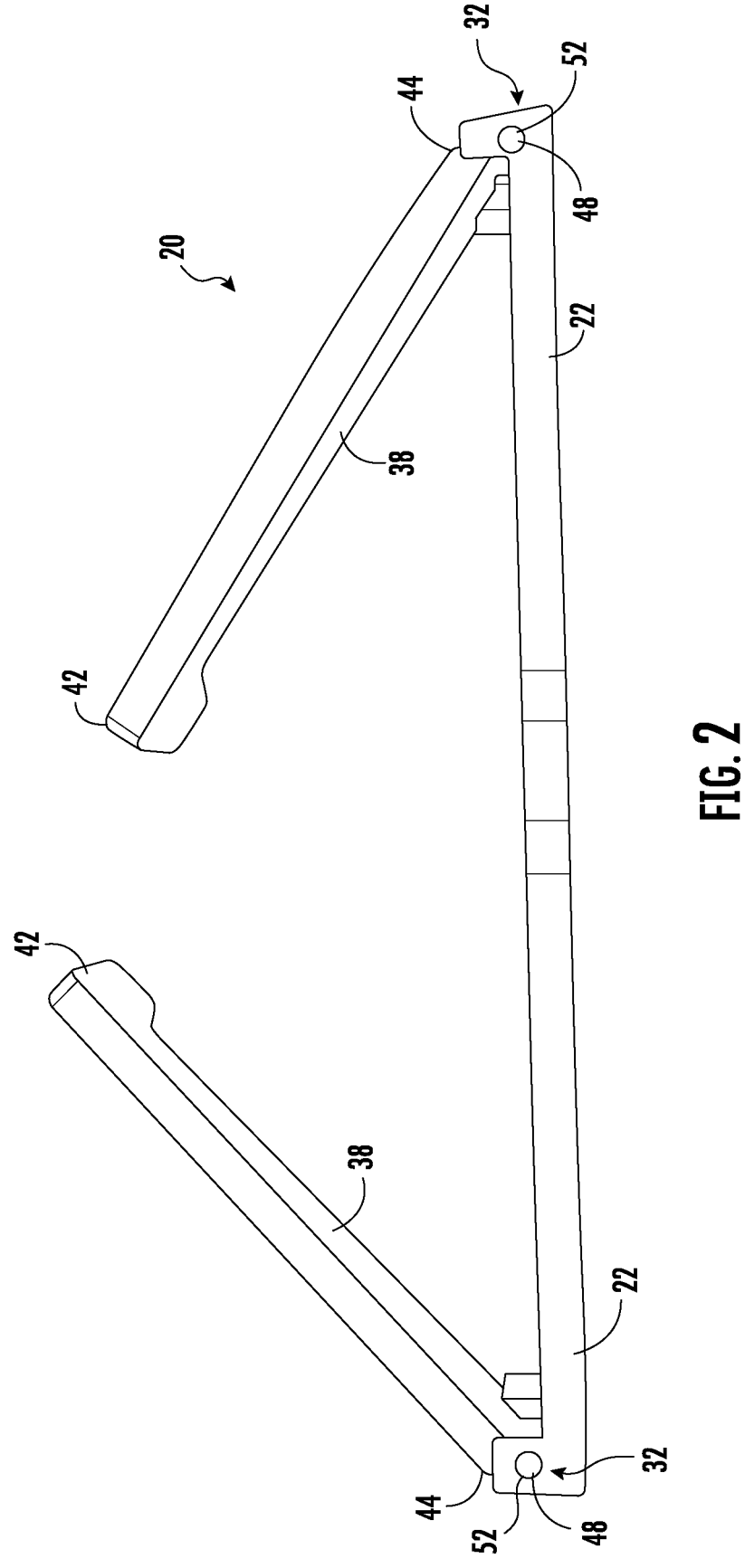
FIG. 2 is a top plan view of the eyeglasses of the present disclosure.

FIG. 1 illustrates the glasses 20 of the present disclosure. As illustrated, glasses 20 include a primary frame 22 that is adapted to be positioned in front of the eyes of the wearer. Frame 22 is defined by opposing ends 24, a pair of lens openings 26, and a centrally located nose bridge 28. Hinge assemblies 32 are included at each opposing end 24. These features of the glasses are the same as conventional glasses and allow for the mounting of prescription lenses, magnifier lenses, bifocals, trifocals, or sunglasses. FIG. 2 illustrates that each end 24 of frame 22 includes a mounting aperture 34 and a recess 36. Mounting aperture 34 and recess 36 allow for opposing temple pieces 38 to be hingedly mounted via hinge assemblies 32 as described below.

Figure 3:
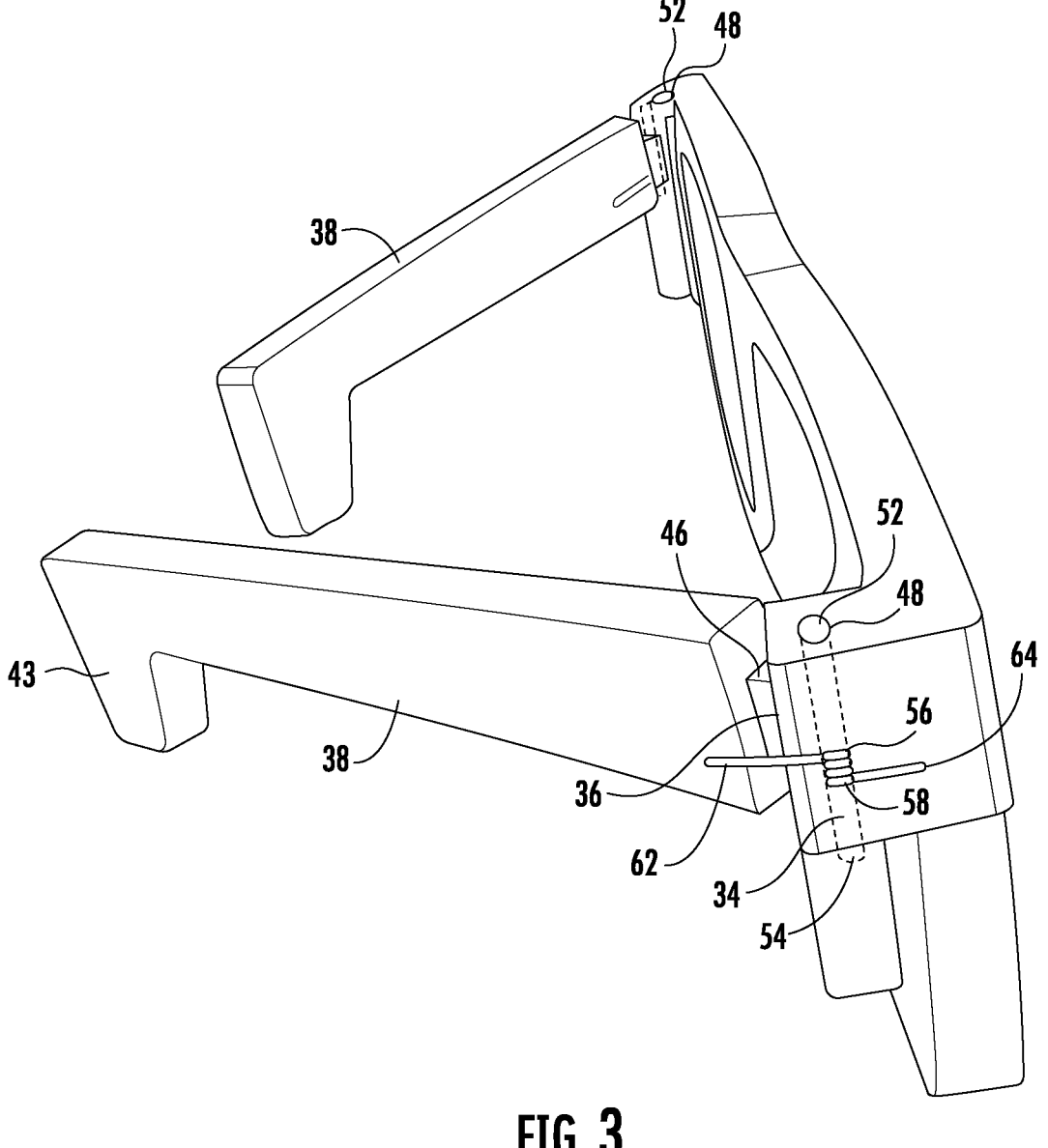
FIG. 3 is a side perspective view of the eyeglasses of the present disclosure.
Figure 4:
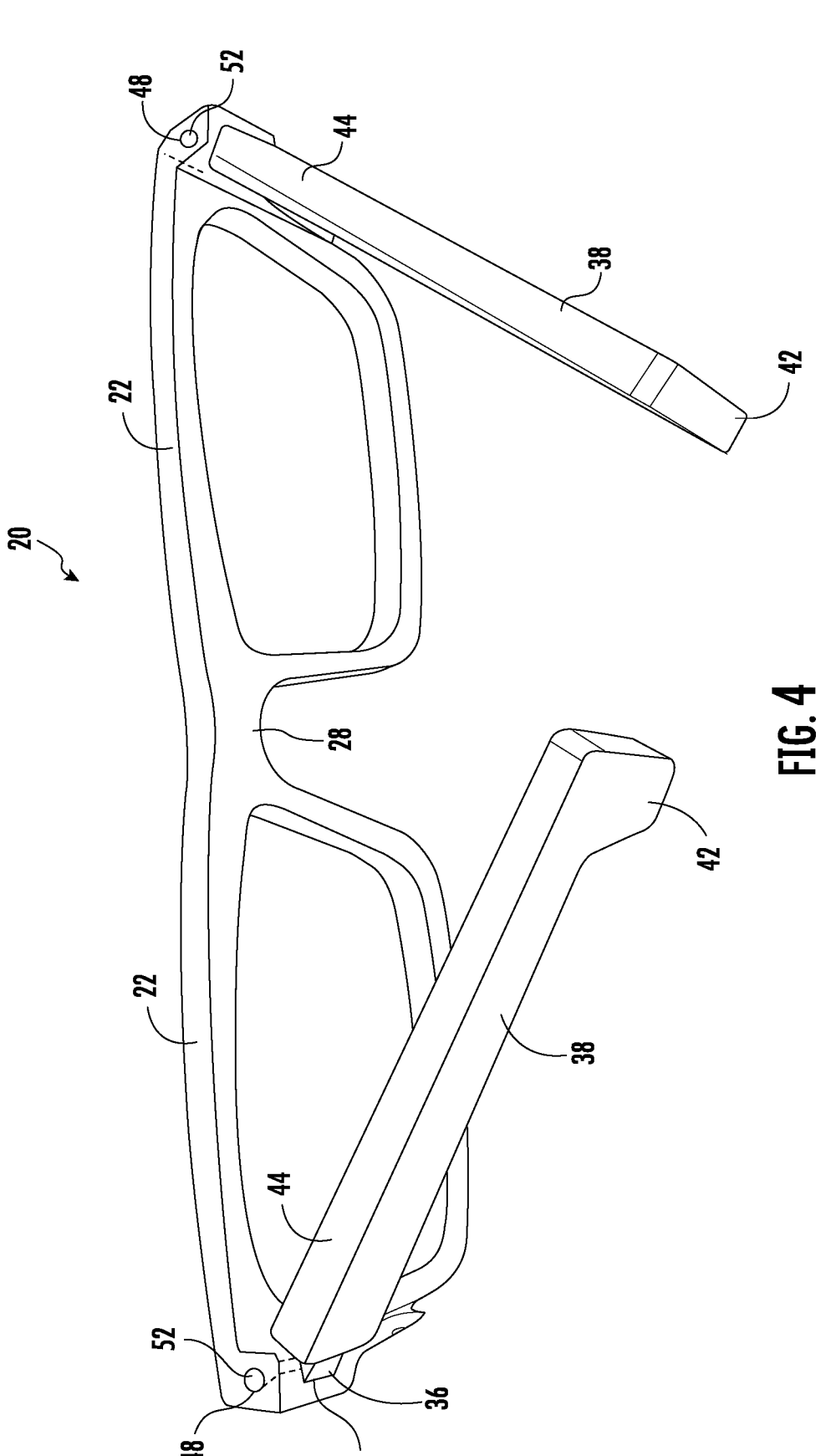
FIG. 4 is a rear perspective view of the eyeglasses of the present disclosure.

FIG. 2 also illustrates the pair of temple pieces 38 that are attached to frame 20. These temple pieces 38 are of a shortened length. In a preferred but non-limiting embodiment, each temple piece 28 is between 2 to 3 inches in length, with a preferred length of approximately 2.5 inches. Each temple piece 38 has a first angled end 42 adapted to rest on a temple of the wearer. Although an angled end 42 is depicted, the end can be formed into any of a variety of shapes or configurations. Indeed, the biased nature of the temple pieces 38 allows them to be straight, and without any angle or bend. In the example of FIG. 3, the angled end 42 includes a fin 43 protruding downwardly therefrom. Notably, the first end 42 of each temple piece 38 does not extend over the ear of the wearer. Each temple piece 38 also has a second end 44. As illustrated in FIG. 3, each second end 44 has a protrusion 46 that is dimensioned to fit within a corresponding recess 36 within frame 22. This allows each end 44 of each temple piece 38 to be pivotally secured to frame 22. This pivotal connection if facilitated by a pair of pins 48. Each pin 48 includes an upper head 52 and a lower body 54. The body 54 of each pin 48 is positioned within one of the mounting apertures 34 of frame 22 to hingedly connect one of the temple pieces 38 to the frame 22.

The two temple pieces 38 are biased inwardly via a pair of torsion springs 56. Each of these torsion springs 56 has a central portion 58 that is positioned about the body of one of the pins 48. Each torsion spring 56 further includes a first end 62 mounted within one of the temple pieces 38 and a second end 64 mounted within the frame 22. In the depicted embodiment, the first end 62 of each spring 56 is fully embedded within a lower extent of the temple piece 38. Similarly, the second end 64 of each temple piece is preferably secured within a central extent of frame 22. Thus, the torsion springs 56 biases the temple pieces 38 inwardly to secure the frame 22 over the temples of a wearer. Ideally each spring 56 exerts a sufficient amount of force to secure its associated temple piece 38 to the check bone of the wearer. This force can be adjustable by the springs as needed.

In the preferred embodiment, each torsion spring 56 includes biased and unbiased states. Furthermore, the orientation of each spring 56 is such that, while in the unbiased state, each temple piece 38 forms an angle of approximately 30 degrees relative to the frame 22. This unbiased state is best illustrated in FIG. 2. As shown in FIG. 2, the angled ends 42 of the temple pieces 38 do not contact each other when the temple pieces 38 are positioned at approximately 30 degrees relative to the frame. Thereafter, the user can move the temple pieces 38 into a biased state. This can be done by pushing the temple pieces 38 inwardly and into contact frame 22. This may be a preferred orientation to place glasses 20 into a container or sleeve for storage or transport. However, temple pieces 38 can also be biased outwardly, such as when the user places glasses 20 over their face. In this orientation, temple pieces 38 contact the temples of the wearer and remain in a biased state, with the spring force serving to secure glasses 20. After removing glasses 20, the temple pieces 38 will return to the unbiased state forming a 30 degree angle relative to frame 22. This unbiased orientation has the advantage of positioning the temple pieces 38 for easy access by the wearer.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. A pair of eyeglasses for a wearer, the wearer having ears and temples, the pair of eyeglasses comprising:

a frame having opposing ends, upper and lower surfaces, a pair of lens openings, and a centrally located nose bridge, a mounting aperture and recess positioned within each opposing end;

a pair of temple pieces, each temple piece having a first angled end adapted to rest on the temple of the wearer, the first angled end having a fin protruding downwardly therefrom, each temple piece being between 2 to 3 inches in length such that each temple piece does not contact the ear of the wearer when the eyeglasses are worn, each temple piece also having a second end, each second end having a protrusion that is pivotally secured into one of the recesses of the frame;

a pair of pins, each pin including an upper head and a lower body, the body of each pin positioned within one of the mounting apertures of the frame to hingedly connect one of the temple pieces to the frame;

a pair of torsion springs, each torsion spring having a biased and unbiased state, each torsion spring further including a central portion positioned about the body of one of the pins, each torsion spring also including a first end fully embedded within one of the temple pieces and a second end fully embedded within the frame;

the pair of torsion springs being oriented such that in the unbiased state each of the temple pieces forms an angle of 30 degrees relative to the frame to allow easy access thereto by the wearer, the temple pieces being configured such that the first angled end of each temple piece does not contact the first angled end of the other temple piece when the temple pieces are oriented at 30 degrees relative to the frame;

whereby the position of the temple pieces with torsion springs in the unbiased state allows the wearer to grasp the temple pieces and place them into the biased state;

wherein the temple pieces can be biased outwardly to be secured to the temples of the wearer;

wherein each temple piece can be biased inwardly to contact the frame for storage or transport;

wherein the head of each pin is flush with the upper surface of the frame;

wherein the first end of each torsion spring is positioned within a lower extent of the temple piece; and wherein the second end of each torsion spring is centrally positioned within the frame.

2. A pair of eyeglasses adapted to be worn by a user, the user having temples and ears, the eyeglasses comprising:

a frame having opposing ends, and upper and lower surfaces, a pair of lens openings, and a nose bridge, a mounting aperture and recess positioned within each opposing end;

a pair of temple pieces, each temple piece having a fin protruding downwardly therefrom and a protrusion that is fitted into one of the recesses of the frame, each temple piece being between 2 to 3 inches in length so that the temple pieces contact the temples of the wearer and not the ears;

a pair of pins, wherein each pin is positioned within one of the mounting apertures of the frame to hingedly connect one of the temple pieces to the frame;

a pair of torsion springs, each torsion spring positioned about one of the pins, each torsion spring including a first end fully embedded within one of the temple pieces and a second end fully embedded within the frame;

wherein in a non-biased state, the temple pieces form an angle of 30 degrees relative to the frame to allow easy access thereto by the wearer, the temple pieces being configured such that the fin of each temple piece does not contact the fin of the other temple piece when the temple pieces are oriented at 30 degrees relative to the frame.

* * * * *